United States Patent
Egashira et al.

(10) Patent No.: US 10,170,952 B2
(45) Date of Patent: Jan. 1, 2019

(54) ROTARY ELECTRIC MACHINE AND MANUFACTURING METHOD FOR COIL OF ROTARY ELECTRIC MACHINE

(71) Applicant: MITSUBISHI ELECTRIC CORPORATION, Chiyoda-ku, Tokyo (JP)

(72) Inventors: Kohei Egashira, Tokyo (JP); Atsushi Sakaue, Tokyo (JP); Tatsuro Hino, Tokyo (JP); Kazunori Muto, Tokyo (JP); Hironori Tsuiki, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 176 days.

(21) Appl. No.: 15/114,635

(22) PCT Filed: Feb. 3, 2015

(86) PCT No.: PCT/JP2015/052968
§ 371 (c)(1),
(2) Date: Jul. 27, 2016

(87) PCT Pub. No.: WO2015/119105
PCT Pub. Date: Aug. 13, 2015

(65) Prior Publication Data
US 2016/0352169 A1 Dec. 1, 2016

(30) Foreign Application Priority Data

Feb. 10, 2014 (JP) .................................. 2014-023140

(51) Int. Cl.
*H02K 3/12* (2006.01)
*H02K 15/04* (2006.01)
*H02K 1/16* (2006.01)

(52) U.S. Cl.
CPC ................. *H02K 3/12* (2013.01); *H02K 1/16* (2013.01); *H02K 15/045* (2013.01); *H02K 2213/03* (2013.01)

(58) Field of Classification Search
CPC .... H02K 15/045; H02K 1/16; H02K 2213/03; H02K 3/12
(Continued)

(56) References Cited

U.S. PATENT DOCUMENTS 6,476,530 B1   11/2002   Nakamura et al.
6,971,153 B2 * 12/2005   Tokizawa ........... H02K 15/0414
                                                         29/596
(Continued)

FOREIGN PATENT DOCUMENTS

CN    103503278 A    1/2014
JP    51-118001 A    10/1976
(Continued)

OTHER PUBLICATIONS

International Search Report (PCT/ISA/210) dated Jan. 20, 2015, by the Japanese Patent Office as the International Searching Authority for International Application No. PCT/JP2014/080248.
(Continued)

*Primary Examiner* — Alex W Mok
(74) *Attorney, Agent, or Firm* — Buchanan Ingersoll & Rooney PC (57) ABSTRACT

Coils that constitute an armature winding are produced by winding a conductor wire that has a rectangular cross section, the coils each include: four rectilinear portions that are inserted into a pair of slots; and three coil end portions that link the four rectilinear portions consecutively by each connecting together end portions of two selected rectilinear portions, the coils being mounted into the armature core so as to be arranged at a pitch of one slot in a circumferential
(Continued)

direction, the coil end portions include: a bulging portion that protrudes axially outward in a convex shape; and oblique portions that link the two connected rectilinear portions and the bulging portion, the bulging portion has a crank portion that displaces radial positions of the two connected rectilinear portions by a set amount, and a cross-sectional area of the bulging portion is smaller than a cross-sectional area of the oblique portions.

9 Claims, 9 Drawing Sheets

(58) Field of Classification Search
USPC .......................................................... 310/201
See application file for complete search history.

(56) References Cited

U.S. PATENT DOCUMENTS

| | | | |
|---|---|---|---|
| 7,719,158 B2* | 5/2010 | Angerpointner | H01R 39/24 310/239 |
| 8,319,390 B2* | 11/2012 | Snitchler | H02K 1/165 310/216.097 |
| 2002/0043886 A1 | 4/2002 | Fujita et al. | |
| 2010/0251796 A1 | 10/2010 | Akimoto et al. | |
| 2014/0021823 A1 | 1/2014 | Kitamura et al. | |
| 2016/0372992 A1 | 12/2016 | Tsuiki et al. | |

FOREIGN PATENT DOCUMENTS

| | | | |
|---|---|---|---|
| JP | 62-89454 | A | 4/1987 |
| JP | 2000-299949 | A | 10/2000 |
| JP | 2001-119881 | A | 4/2001 |
| JP | 2002-125338 | A | 4/2002 |
| JP | 2009-11151 | A | 1/2009 |
| JP | 2010-259314 | A | 11/2010 |
| JP | 2010-263771 | A | 11/2010 |
| JP | 2011-147292 | A | 7/2011 |
| JP | 2014-135857 | A | 7/2014 |
| WO | 2012137306 | A1 | 10/2012 |
| WO | WO 2014/065026 | A1 | 5/2014 |
| WO | WO 2015/111287 | A1 | 7/2015 |

OTHER PUBLICATIONS

Written Opinion (PCT/ISA/237) dated Jan. 20, 2015, by the Japanese Patent Office as the International Searching Authority for International Application No. PCT/JP2014/080248.
International Search Report (PCT/ISA/210) dated Apr. 28, 2015, by the Japanese Patent Office as the International Searching Authority for International Application No. PCT/JP2015/052968.
Written Opinion (PCT/ISA/237) dated Apr. 28, 2015, by the Japanese Patent Office as the International Searching Authority for International Application No. PCT/JP2015/052968.
Office Action dated Dec. 25, 2017, by the Chinese Patent Office in corresponding Chinese Patent Application No. 201580008115.8 and English translation of the Office Action. (9 pages).

* cited by examiner

ROTARY ELECTRIC MACHINE AND MANUFACTURING METHOD FOR COIL OF ROTARY ELECTRIC MACHINE

TECHNICAL FIELD

The present invention relates to a rotary electric machine such as an electric motor or a generator, for example, and to a manufacturing method for a coil therefor, and particularly relates to a coil structure that constitutes an armature winding.

BACKGROUND ART

In recent years, compactness, high output, and high quality have been required in rotary electric machines that are used as electric motors or generators. In high-output rotary electric machines of this kind, since high voltages are applied, electric potential differences that arise between coils that are mounted into an armature core have increased, and it has become necessary to have electrical insulation distances that can bear them. However, if electrical insulation distances are increased, then heights of coil ends are increased proportionately, enlarging the rotary electric machine overall.

In consideration of such conditions, conventional rotary electric machines have been proposed that achieve reductions in size by making a cross-sectional shape of rectilinear portions of coils that are inserted into slots into a rectangular shape to increase space factor and enable increases in output, while also making a cross-sectional shape of coil end portions that links together the rectilinear portions into a circular shape to suppress interference among the coil end portions and reduce coil end height (see Patent Literature 1, for example).

CITATION LIST

Patent Literature

Patent Literature 1: Japanese Patent Laid-Open No. 2002-125338 (Gazette)

SUMMARY OF THE INVENTION

Problem to be Solved by the Invention

However, in conventional rotary electric machines such as that described in Patent Literature 1, one problem has been that if conductor wire that has a rectangular cross section is used, then a step for forming portions of the conductor wire that correspond to the coil end portions so as to have a circular cross section and a coil forming step for forming the conductor wire into the coil pattern are required separately, reducing productivity. Moreover, if conductor wire that has a circular cross section is used, then a step for forming portions of the conductor wire that correspond to the rectilinear portions so as to have a rectangular cross section and a coil forming step for forming the conductor wire into the coil pattern are required separately.

The present invention aims to solve the above problems and an object of the present invention is to provide a rotary electric machine and a manufacturing method for a coil therefor that enable reductions in size by making cross-sectional shapes of rectilinear portions and coil end portions of the coil into rectangular shapes, to eliminate a need for a step of forming a conductor wire so as to have a circular cross section, thereby enabling improvements in output and productivity, and by making a cross-sectional area of bulging portions in top portions of the coil end portions smaller than a cross-sectional area of oblique portions, to suppress interference among the coil end portions.

Means for Solving the Problem

A rotary electric machine according to the present invention includes an armature that includes: an annular armature core in which a plurality of teeth are arranged circumferentially, and in which slots are formed between the teeth; and an armature winding that is mounted to the armature core. The armature winding is constituted by a plurality of distributed-winding coils that are each produced by winding a conductor wire that is insulated, that is jointless and continuous, and that has a rectangular cross section, and the coils each include: 2m rectilinear portions that are inserted into a pair of slots that include two of the slots so as to have longitudinal directions oriented in an axial direction, where m is an integer that is greater than or equal to one; and (2m−1) coil end portions that link the 2m rectilinear portions consecutively by each connecting together end portions of two selected rectilinear portions among the 2m rectilinear portions, the coils being mounted in one or more layers in a radial direction in the armature core so as to be arranged at a pitch of one slot in a circumferential direction. The coil end portions include: a bulging portion that protrudes axially outward in a convex shape; and oblique portions that link the two connected rectilinear portions and the bulging portion, the bulging portion has a crank portion that displaces radial positions of the two connected rectilinear portions by a set amount; and a cross-sectional area of the bulging portion is smaller than a cross-sectional area of the oblique portions.

Effects of the Invention

According to the present invention, the armature winding is constituted by a plurality of distributed-winding coils that are each produced by winding a conductor wire that has a rectangular cross section. Thus, the rectilinear portions that are inserted into the slots have a rectangular cross section, increasing space factor, which enables increased output to be achieved. A step of forming the conductor wire so as to have a circular cross section is no longer required, increasing productivity.

In the coil end portions, because the cross-sectional area of the bulging portion is smaller than the cross-sectional area of the oblique portions, interference among the coil end portions is suppressed, enabling the axial height of the coil end portions to be lowered, which enables reductions in size.

DESCRIPTION OF EMBODIMENTS

Preferred embodiments of a rotary electric machine and a manufacturing method therefor according to the present invention will now be explained with reference to the drawings.

Embodiment 1

Figure 1:
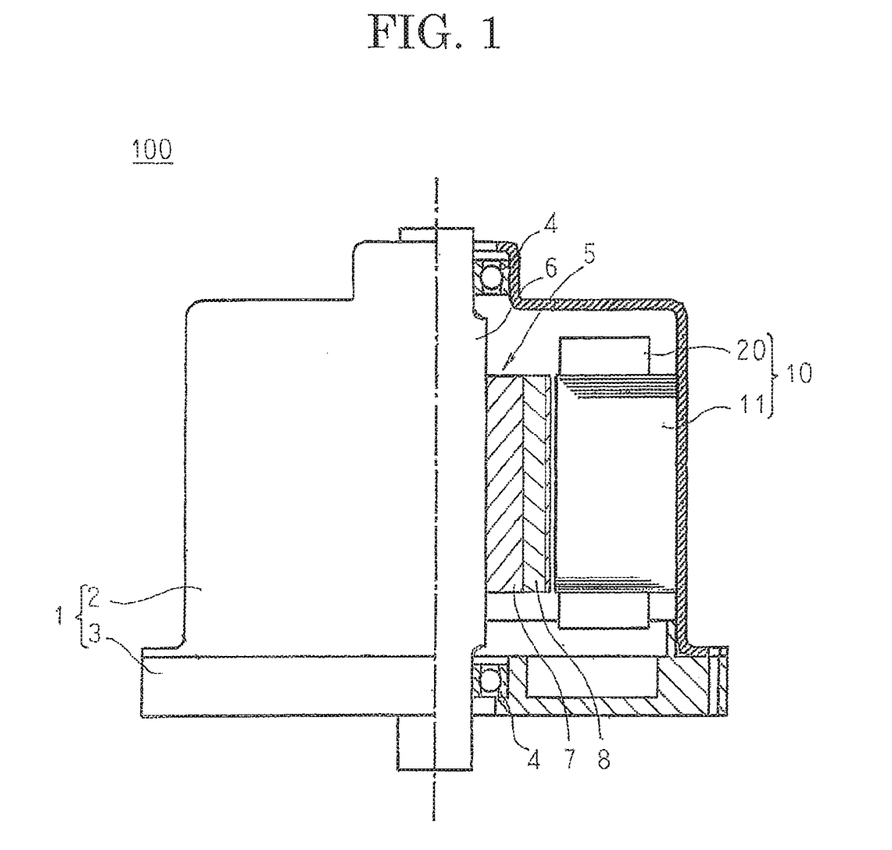
FIG. 1 is a half section that shows a rotary electric machine according to Embodiment 1 of the present invention.
Figure 2:
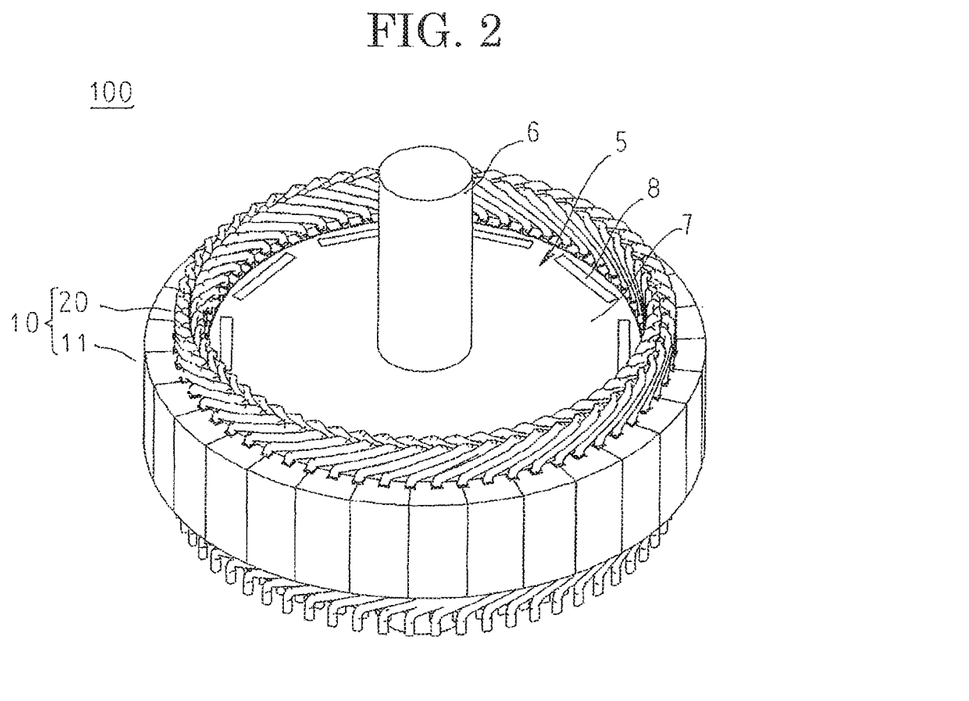
FIG. 2 is an oblique projection that shows part of the rotary electric machine according to Embodiment 1 of the present invention.
Figure 3:
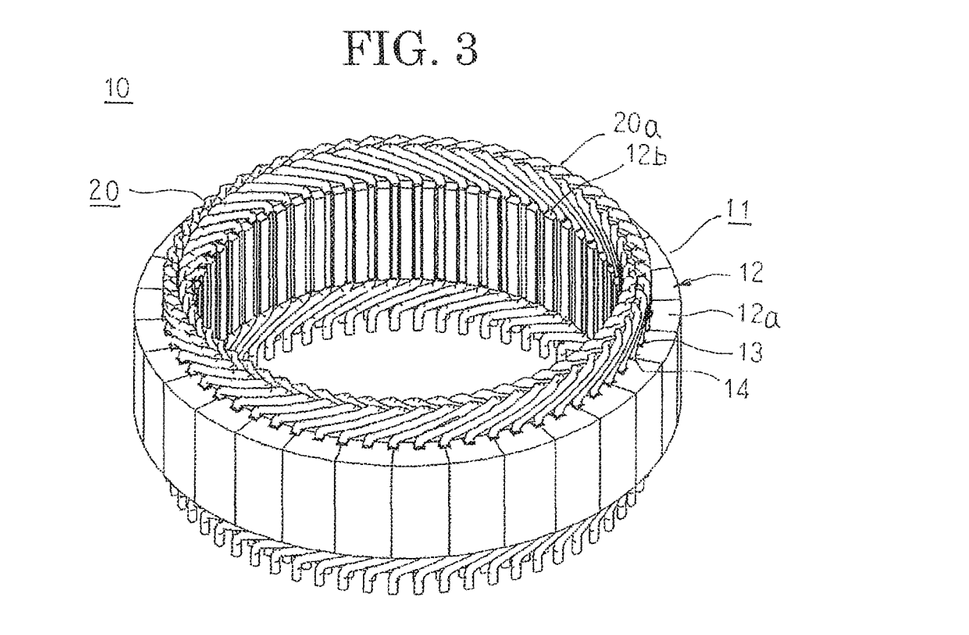
FIG. 3 is an oblique projection that shows an armature that is used in the rotary electric machine according to Embodiment 1 of the present invention.
Figure 4:
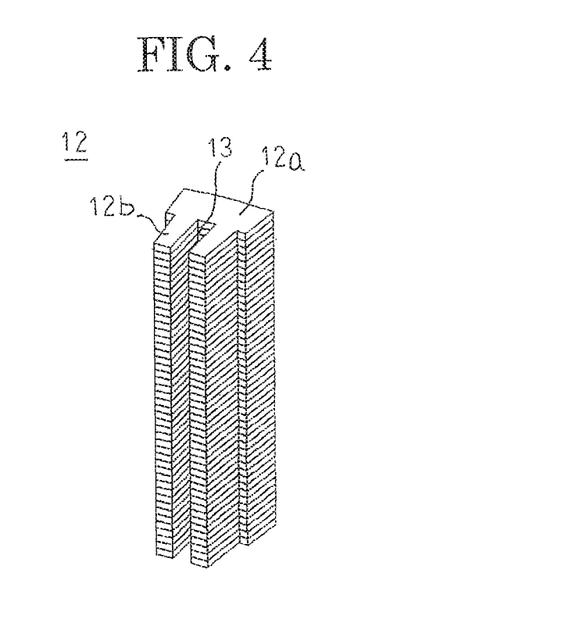
FIG. 4 is an oblique projection that shows a core block that constitutes part of an armature core that is used in the rotary electric machine according to Embodiment 1 of the present invention.
Figure 5:
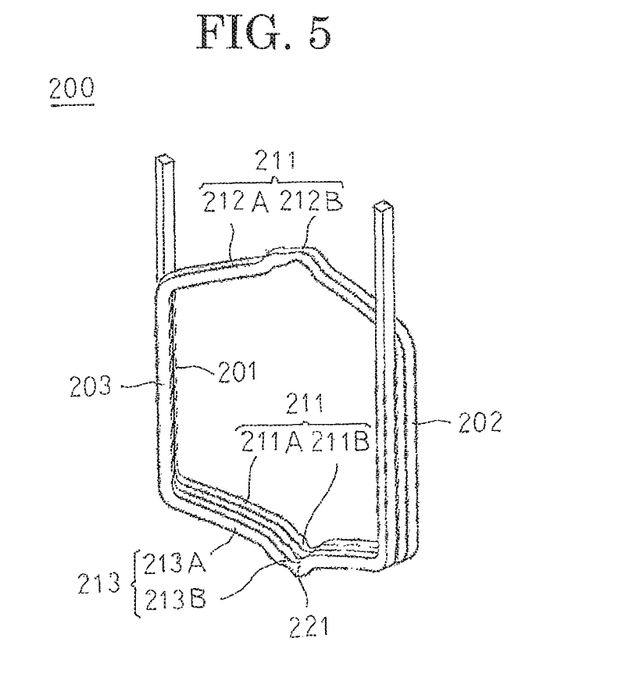
FIG. 5 is an oblique projection that shows a coil that constitutes part of an armature winding that is used in the rotary electric machine according to Embodiment 1 of the present invention.
Figure 6:
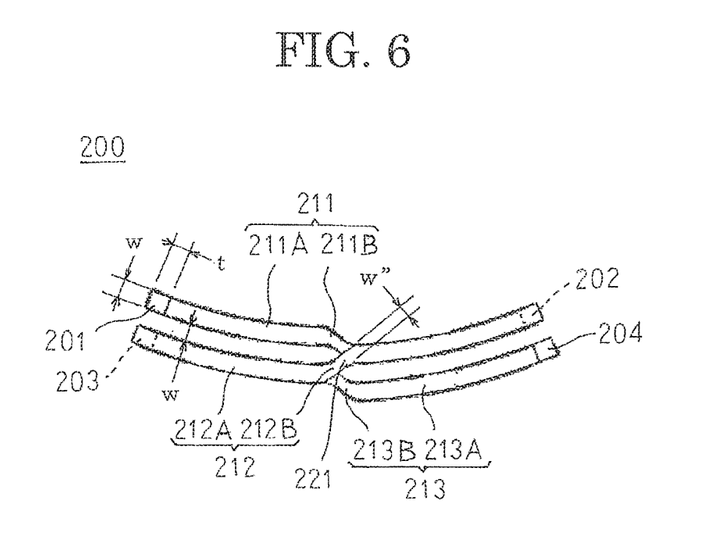
FIG. 6 is an end elevation that shows the coil that constitutes part of the armature winding that is used in the rotary electric machine according to Embodiment 1 of the present invention.
Figure 7:
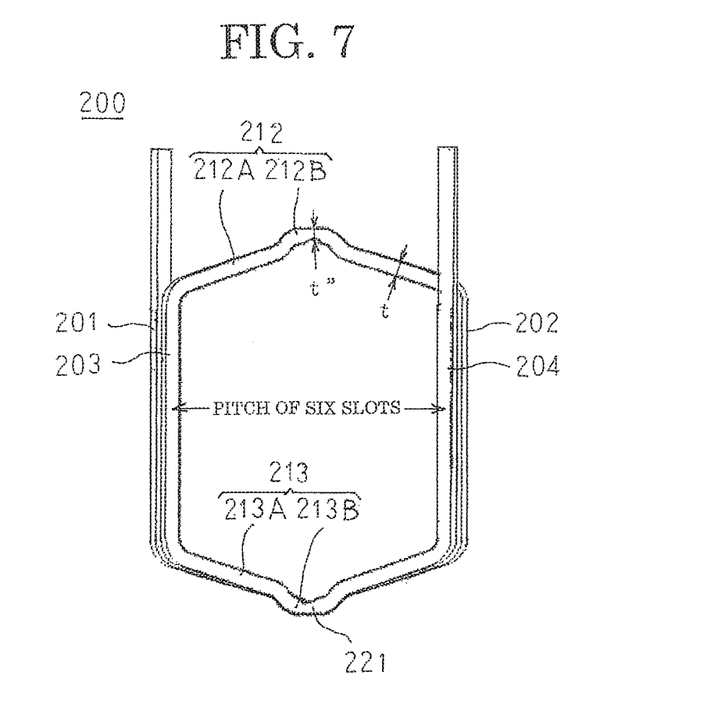
FIG. 7 is a front elevation that shows the coil that constitutes part of the armature winding that is used in the rotary electric machine according to Embodiment 1 of the present invention.
Figure 8A:
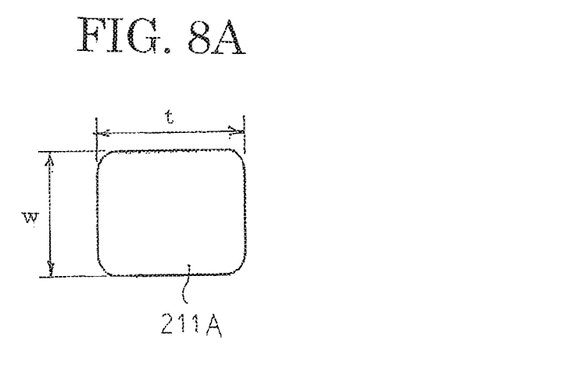
FIG. 8A is a cross section that shows an oblique portion of a coil end portion of the coil that constitutes part of the armature winding that is used in the rotary electric machine according to Embodiment 1 of the present invention.
Figure 8B:
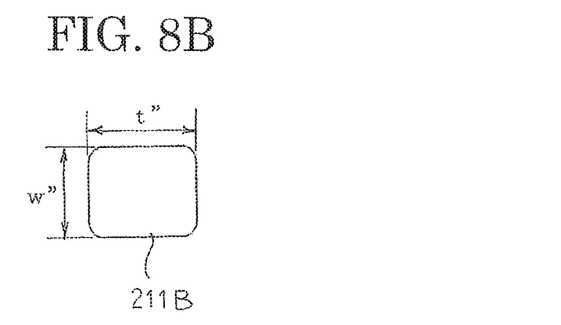
FIG. 8B is a cross section that shows a top portion of the coil end portion of the coil that constitutes part of the armature winding that is used in the rotary electric machine according to Embodiment 1 of the present invention.
Figure 9:
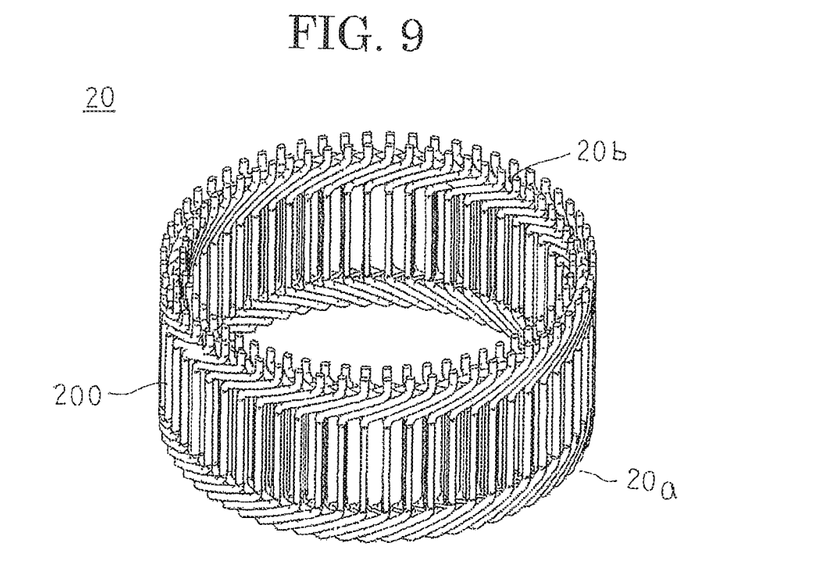
FIG. 9 is an oblique projection that shows an armature winding that is used in the rotary electric machine according to Embodiment 1 of the present invention.
Figure 10:
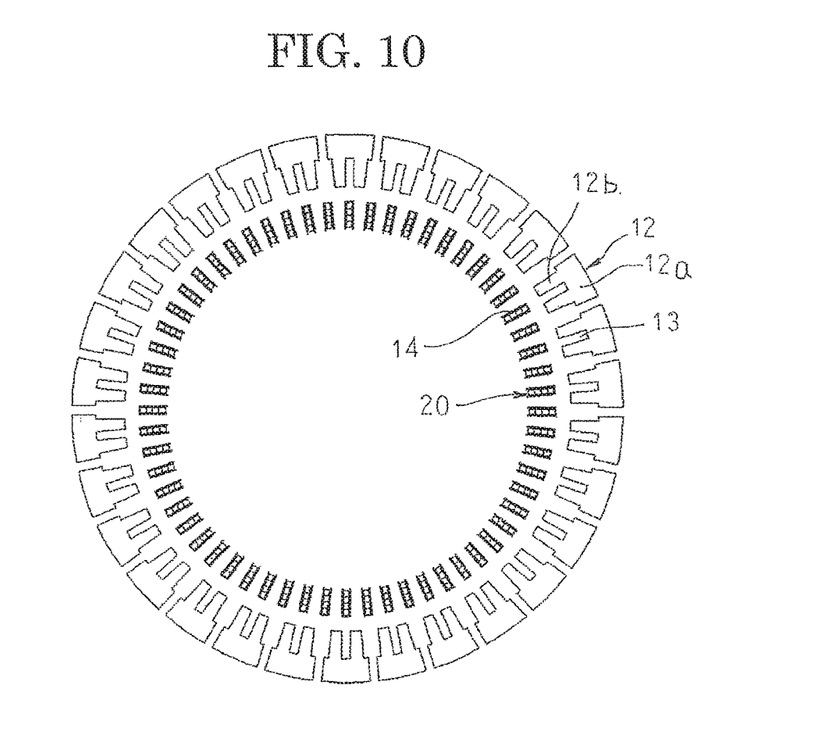
FIG. 10 is a diagram that explains a manufacturing method for an armature that is used in the rotary electric machine according to Embodiment 1 of the present invention.
Figure 11:
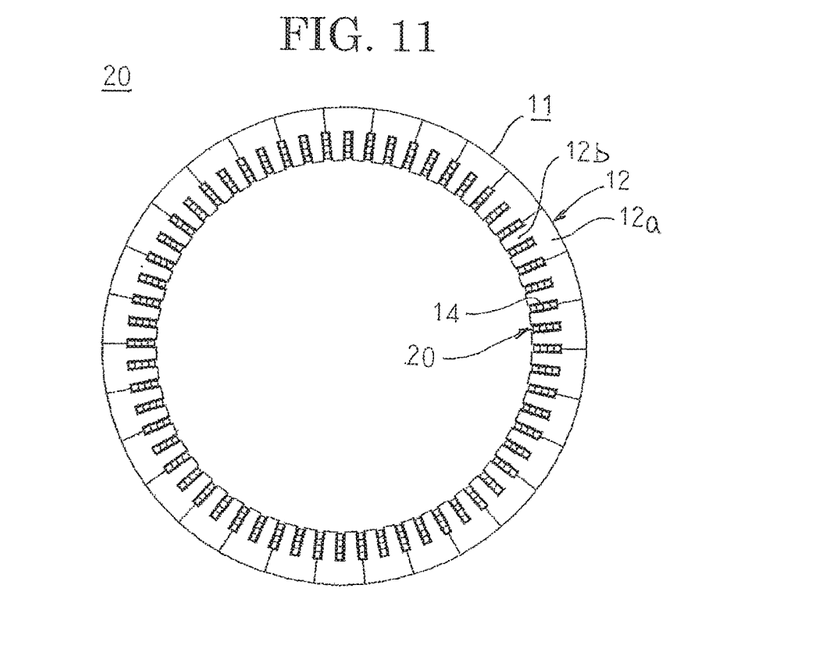
FIG. 11 is a diagram that explains the manufacturing method for the armature that is used in the rotary electric machine according to Embodiment 1 of the present invention.

FIG. 1 is a half section that shows a rotary electric machine according to Embodiment 1 of the present invention, FIG. 2 is an oblique projection that shows part of the rotary electric machine according to Embodiment 1 of the present invention, FIG. 3 is an oblique projection that shows an armature that is used in the rotary electric machine according to Embodiment 1 of the present invention, FIG. 4 is an oblique projection that shows a core block that constitutes part of an armature core that is used in the rotary electric machine according to Embodiment 1 of the present invention, FIG. 5 is an oblique projection that shows a coil that constitutes part of an armature winding that is used in the rotary electric machine according to Embodiment 1 of the present invention, FIG. 6 is an end elevation that shows the coil that constitutes part of the armature winding that is used in the rotary electric machine according to Embodiment 1 of the present invention, FIG. 7 is a front elevation that shows the coil that constitutes part of the armature winding that is used in the rotary electric machine according to Embodiment 1 of the present invention. FIG. 8A is a cross section that shows an oblique portion of a coil end portion of the coil that constitutes part of the armature winding that is used in the rotary electric machine according to Embodiment 1 of the present invention, and FIG. 8B is a cross section that shows a top portion of the coil end portion of the coil that constitutes part of the armature winding that is used in the rotary electric machine according to Embodiment 1 of the present invention. FIG. 9 is an oblique projection that shows an armature winding that is used in the rotary electric machine according to Embodiment 1 of the present invention, and FIGS. 10 and 11 are respective diagrams that explain a manufacturing method for an armature that is used in the rotary electric machine according to Embodiment 1 of the present invention.

In FIGS. 1 and 2, a rotary electric machine 100 includes: a housing 1 that has: a floored cylindrical frame 2; and an end plate 3 that closes an opening of the frame 2; an armature 10 that is inserted into and fixed to a cylindrical portion of the frame 2; and a rotor 5 that is fixed to a rotating shaft 6 that is rotatably supported in the floor portion of the frame 2 and the end plate 3 by means of bearings 4 so as to be rotatably disposed on an inner circumferential side of the armature 10.

The rotor 5 is a permanent-magnet rotor that includes: a rotor core 7 that is fixed to the rotating shaft 6, which is inserted through a central position thereof; and permanent magnets 8 that are embedded near an outer circumferential surface of the rotor core 7 so as to be arranged at a predetermined pitch circumferentially to constitute magnetic poles. Moreover, the rotor 5 is not limited to a permanent-magnet rotor, and a squirrel-cage rotor in which uninsulated rotor conductors are housed in slots of a rotor core such that two sides are shorted by a shorting ring, or a wound rotor in which insulated conductor wires are mounted into slots of a rotor core, etc., may be used.

Next, configuration of the armature 10 will be explained in detail with reference to FIGS. 3 through 8B.

As shown in FIG. 3, the armature 10 includes: an armature core 11; an armature winding 20 that is mounted onto the armature core 11; and slot cells 44 that electrically insulate the armature winding 20 and the armature core 11. Here, to facilitate explanation, the number of poles in the rotor 5 is ten, the number of slots in the armature core 11 is sixty, and the armature winding 20 is a three-phase winding. In other words, the number of slots per phase per pole is two.

As shown in FIG. 4, core blocks 12 are made by dividing the annular armature core 11 into thirty equal sections circumferentially, and include: a core back portion 12a that has a circular arc-shaped cross section, that is produced by laminating and integrating a predetermined number of electromagnetic steel sheets; and two teeth 12b that are disposed so as to extend radially inward from an inner circumferential wall surface of the core back portion 12a. The armature core 11 is configured into an annular shape by arranging and integrating thirty core blocks 12 circumferentially by butting together circumferential side surfaces of the core back portions 12a such that the teeth 12b are oriented radially inward. Slots 13 that are formed by the core back portions 12a and two circumferentially adjacent teeth 12b are arranged at a uniform angular pitch circumferentially so as to be open on an inner circumferential side. The teeth 12b are formed so as to have a tapered shape in which a circumferential width becomes gradually narrower radially inward, and a cross section of the slots 13 that is perpendicular to a central axis of the armature core 11 is oblong.

The armature winding 20 is constituted by sixty coils 200. The coils 200 are hexagonal coils that are configured into a coil pattern in which a conductor wire 19 is wound for two turns helically in an approximately hexagonal shape, the conductor wire 19 being made of jointless continuous copper wire or aluminum wire that is insulated using an enamel resin, for example, and that has an oblong cross section. Here, the conductor wire 19 is formed so as to have a rectangular cross section that has a long-side length t and a short-side length w.

Specifically, as shown in FIGS. 5 through 7, the coils 200 include: first, second, third, and fourth rectilinear portions 201, 202, 203, and 204 that are inserted into the slots 13 of the armature core 11; a first coil end portion 211 that connects together first end portions of the first and second rectilinear portions 201 and 202; a second coil end portion 212 that connects together second end portions of the second and third rectilinear portions 202 and 203; and a third coil end portion 213 that connects together first end portions of the third and fourth rectilinear portions 203 and 204.

In this manner, the coils 200 are configured such that the first through fourth rectilinear portions 201 through 204 are linked continuously by the first through third coil end portions 211 through 213.

The first through third coil end portions 211 through 213 include: oblique portions 211A, 212A, and 213A that respectively rise up obliquely from the first through fourth rectilinear portions 201 through 204; and bulging portions 211B, 212B, and 213B that bulge outward in an axial direction (a longitudinal direction of the rectilinear portions) from top portions thereof. In addition, a crank portion 221 that displaces radially by the short-side length w of the conductor wire 19 is formed on each of the bulging portions 211B through 213B. Furthermore, the oblique portions 211A, 212A, and 213A maintain radial positions that are similar or identical to those of the first through fourth rectilinear portions 201 through 204 at the point of rising up. In other words, the oblique portions 211A, 212A, and 213A have circular arc shapes that have as a radius a distance between the first through fourth rectilinear portions 201 through 204 at the point of rising up and a central axis of the armature core 11 when viewed from axially outside when the armature winding 20 is mounted to the armature core 11.

The first and third rectilinear portions 201 and 203 are arranged in a single column such that long-side length directions of the oblong cross sections are oriented in a circumferential direction so as to leave a gap w in the short-side length direction of the oblong cross sections. The second and fourth rectilinear portions 202 and 204 are arranged in a single column so as to be separated by a pitch of six slots in a first circumferential direction from the column of first and third rectilinear portions 201 and 203 such that long-side length directions of the oblong cross sections are oriented in a circumferential direction so as to leave a gap w in the short-side length direction of the oblong cross sections. Consequently, the coils 200 are distributed-winding coils. Moreover, a pitch of six slots is a pitch between slot centers of slots 13 on two sides of six consecutive teeth 12b. Here, a pitch of six slots corresponds to a pitch of one magnetic pole. A distributed-winding coil is a coil that is produced by winding a conductor wire into slots 13 that are positioned on two sides of two or more circumferentially consecutive teeth 12b.

Here, as shown in FIG. 8A, the oblique portions 211A, 212A, and 213A have a rectangular cross-sectional shape in which a long-side length is t and a short-side length is w, i.e., a cross-sectional shape that is identical to that of the first through fourth rectilinear portions 201, 202, 203, and 204. As shown in FIG. 8B, the bulging portions 211B, 212B, and 213B have a rectangular cross-sectional shape in which a long-side length is t" and a short-side length is w". Since t>t" and w>w", cross-sectional area of the bulging portions 211B, 212B, and 213B is smaller than cross-sectional area of the oblique portions 211A, 212A, and 213A. Furthermore, surfaces of the bulging portions 211B, 212B, and 213B that face axially inward before crank portion formation also face axially inward after crank portion formation, and surfaces of the bulging portions 211B, 212B, and 213B that face axially outward before crank portion formation also face axially outward after crank portion formation.

Sixty coils 200 that are configured in this manner are arranged at a pitch of one slot circumferentially, to assemble the armature winding 20 that is shown in FIG. 9. In the armature winding 20, sixty columns of four first through fourth rectilinear portions 201 through 204 that are lined up in a single column radially are arranged circumferentially at a pitch of one slot. A group of first coil end portions 211 in which the first coil end portions 211 are arranged circumferentially at a pitch of one slot and a group of third coil end portions 213 in which the third coil end portions 213 are arranged circumferentially at a pitch of one slot are arranged in two layers in a radial direction at a first axial end of the armature winding 20 to constitute first coil ends 20a. A group of second coil end portions 212 in which the second coil end portions 212 are arranged circumferentially at a pitch of one slot is arranged in a single layer in a radial direction at a second axial end of the armature winding 20 to constitute second coil ends 20b.

The slot cells 14, which have been shaped by bending into a U shape, are mounted onto each of the columns of first through fourth rectilinear portions 201 through 204. Next, as shown in FIG. 10, the thirty core blocks 12 are arranged at an approximately uniform angular pitch circumferentially such that the respective teeth are positioned on a radially outer side between adjacent columns of first through fourth rectilinear portions 201 through 204 of the armature winding 20. Next, the core blocks 12 that are arranged circumferentially are moved radially inward, to insert the respective teeth 12b of the core blocks 12 between the adjacent columns of first through fourth rectilinear portions 201 through 204.

As shown in FIG. 11, circumferential side surfaces of the adjacent core blocks 12 are butted together to mount the thirty core blocks 12 into the armature winding 20. Next, the core blocks 12 that are arranged into an annular shape are integrated by being pressed into and fixed to the frame 2, to produce the armature core 11. The armature winding 20 is thereby mounted to the armature core 11, assembling the armature 10 that is shown in FIG. 3. Four first through fourth rectilinear portions 201 through 204 are housed in each of the slots 13 such that the longitudinal directions of the long sides of the oblong cross sections are oriented circumferentially so as to be arranged in a single column in a radial direction. Furthermore, a connection process is applied to the armature winding 20 to form a three-phase alternating-current winding. A rotary electric machine that is assembled in this manner operates as a ten-pole, sixty-slot inner-rotor electric motor.

According to Embodiment 1, because the first through fourth rectilinear portions 201, 202, 203, and 204 that are inserted into the slots 13 are configured so as to have rectangular cross-sections, space factor is increased, enabling increased output to be achieved in the rotary electric machine 100.

The cross-sectional area of the bulging portions 211B, 212B, and 213B is smaller than the cross-sectional area of the oblique portions 211A, 212A, and 213A. Thus, the height of the coil ends is reduced, enabling the rotary electric machine 100 to be reduced in size. In addition, gaps between circumferentially adjacent bulging portions 211B, 212B, and 213B are wider, enabling heat radiating characteristics of the armature winding 20 to be improved.

Because the short-side length w" (the radial width) of the bulging portions 211B, 212B, and 213B is shorter than the short-side length w of the oblique portions 211A, 212A, and 213A, gaps between the circumferentially adjacent bulging portions 211B, 212B, and 213B are wider, enabling heat radiating characteristics of the armature winding 20 to be improved further. Because the long-side length t" (the axial width) of the bulging portions 211B, 212B, and 213B is shorter than the long-side length t of the oblique portions 211A, 212A, and 213A, axial dimensions of the coil ends are reduced, enabling the rotary electric machine 100 to be reduced in size.

Because each of the portions of the coils 200 has a rectangular cross section, a step of forming a circular cross section on the conductor wire 19 when forming coils 200 using a conductor wire 19 that has a rectangular cross section is no longer required, increasing productivity.

Because reducing the cross-sectional area of the bulging portions 211B, 212B, and 213B can be simultaneously implemented in a step for forming the bulging portions 211B, 212B, and 213B or in a step for forming the crank portions 221, the coils 200 can be formed without increasing the number of steps, increasing productivity.

Now, because the first through third coil end portions 211, 212, and 213 are arranged circumferentially at a pitch of one slot, high dimensional precision is required in the first through third coil end portions 211, 212, and 213 in order to avoid interference among the first through third coil end portions 211, 212, and 213. Since the oblique portions 211A, 212A, and 213A are formed by bending root portions, high dimensional precision is ensured. However, because the top portions of the first through third coil end portions 211, 212, and 213 are formed by bending into crank shapes after shaping the conductor wire 19 by bending into a convex shape, it is difficult to ensure high dimensional precision. In Embodiment 1, because the cross-sectional area of the bulging portions 211B, 212B, and 213B is smaller than the cross-sectional area of the oblique portions 211A, 212A, and 213A, even if the dimensional precision of the bulging portions 211B, 212B, and 213B and the crank portions 221 does hypothetically deteriorate, gaps between the circumferentially adjacent crank portions 221 can be ensured sufficiently to enable interference among the first through third coil end portions 211, 212, and 213 to be avoided.

Figure 12:
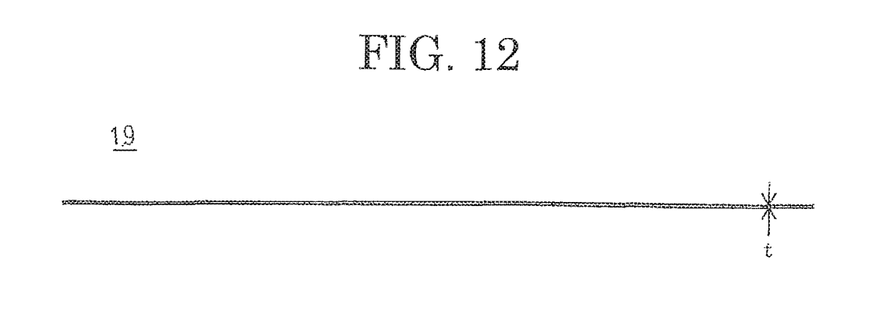
FIG. 12 is a plan that shows a conductor wire that is used in a coil for an armature winding that is used in the rotary electric machine according to Embodiment 1 of the present invention.

Next, a manufacturing method for the coils 200 will be explained with reference to FIGS. 12 through 14B. FIG. 12 is a plan that shows a conductor wire that is used in a coil for an armature winding that is used in the rotary electric machine according to Embodiment 1 of the present invention, FIG. 13A is a diagram that explains a state before formation of a bulging portion in a bulging portion forming step in a manufacturing method for an armature winding coil that is used in the rotary electric machine according to Embodiment 1 of the present invention, FIG. 13B is a diagram that explains a state after formation of the bulging portion in the bulging portion forming step in the manufacturing method for the armature winding coil that is used in the rotary electric machine according to Embodiment 1 of the present invention, FIG. 14A is a diagram that explains a state before formation of a crank portion in a crank portion forming step in the manufacturing method for the armature winding coil that is used in the rotary electric machine according to Embodiment 1 of the present invention, and FIG. 14B is a diagram that explains a state after formation of the crank portion in the crank portion forming step in the manufacturing method for the armature winding coil that is used in the rotary electric machine according to Embodiment 1 of the present invention.

First, as shown in FIG. 12, a conductor wire 19 that has a rectangular cross section that has a long-side length t and a short-side length w is prepared.

Figure 13A:
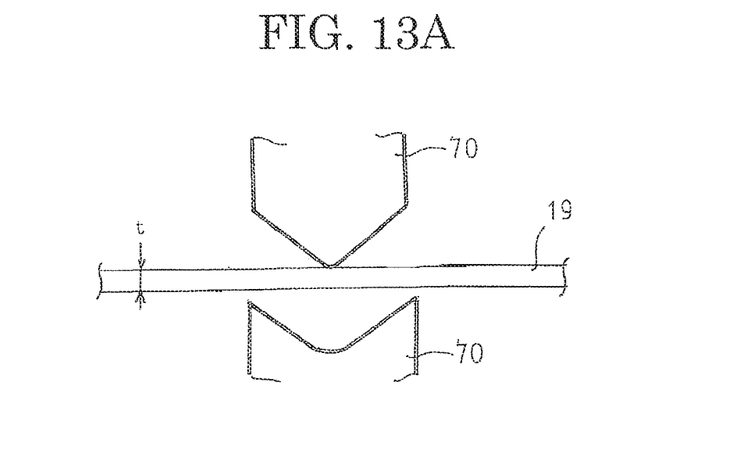
FIG. 13A is a diagram that explains a state before formation of a bulging portion in a bulging portion forming step in a manufacturing method for an armature winding coil that is used in the rotary electric machine according to Embodiment 1 of the present invention.
Figure 13B:
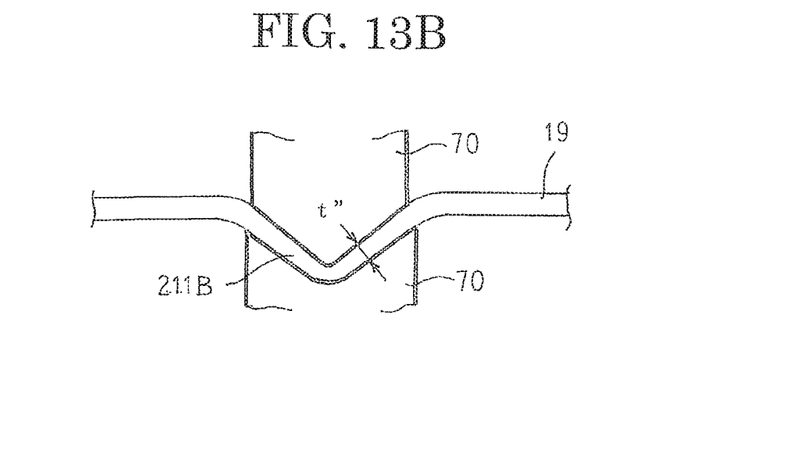
FIG. 13B is a diagram that explains a state after formation of the bulging portion in the bulging portion forming step in the manufacturing method for the armature winding coil that is used in the rotary electric machine according to Embodiment 1 of the present invention.

Next, as shown in FIG. 13A, a position of formation of the bulging portion 211B on the conductor wire 19 is disposed between bulging portion forming tools 70 and 70. Then, as shown in FIG. 13B, the bulging portion 211B, which is bent convexly, is formed by the bulging portion forming tools 70 and 70 by crushing from the long-side length direction of the conductor wire 19 (a bulging portion forming step). Here, the bulging portion 211B is pressed by the bulging portion forming tools 70 and 70 by a load that is sufficient to crush the bulging portion 211B so as to be plastically deformed into a cross section that has a long-side length t" and a short-side length w", the cross-sectional area being reduced from S (=t×w) to S" (=t"×w"). Bulging portions 212B and 213B that have reduced cross-sectional area are similarly formed at positions of formation of the bulging portions 212B and 213B on the conductor wire 19.

Figure 14A:
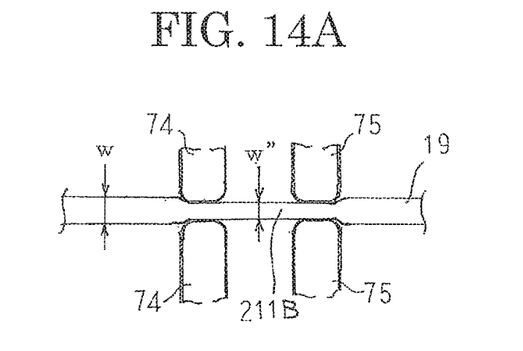
FIG. 14A is a diagram that explains a state before formation of a crank portion in a crank portion forming step in the manufacturing method for the armature winding coil that is used in the rotary electric machine according to Embodiment 1 of the present invention.
Figure 14B:
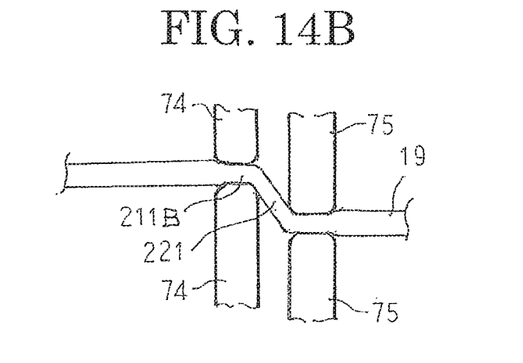
FIG. 14B is a diagram that explains a state after formation of the crank portion in the crank portion forming step in the manufacturing method for the armature winding coil that is used in the rotary electric machine according to Embodiment 1 of the present invention.

Next, as shown in FIG. 14A, portions of the conductor wire 19 at two ends of the bulging portion 211B are respectively gripped by first and second step forming tools 74 and 75 from short-side length directions. Next, as shown in FIG. 14B, the second step forming tool 75 is displaced in a short-side length direction of the conductor wire 19 relative to the first step forming tool 74 to form a crank portion 221 on the bulging portion 211B (a crank portion forming step). Here, the first step forming tool 74 is permitted movement only in the longitudinal direction of the conductor wire 19, and moves toward the second step forming tool 75 as the bulging portion 211B is bent into the crank shape. Crank portions 221 are similarly formed on each of the bulging portions 212B and 213B.

Next, two root portions of the bulging portion 211B are bent such that short sides thereof are radially-inner surfaces to form the oblique portions 211A (an oblique portion forming step). Next, root portions of the oblique portions 211A are bent such that short sides thereof are radially-inner surfaces to form the first and second rectilinear portions 201 and 202 (a rectilinear portion forming step). Next, two root portions of the bulging portion 212B are bent such that short sides thereof are radially-inner surfaces to form the oblique portions 212A. Next, root portions of the oblique portions 212A are bent such that short sides thereof are radially-inner surfaces to form the second and third rectilinear portions 202 and 203. Next, two root portions of the bulging portion 213B are bent such that short sides thereof are radially-inner surfaces to form the oblique portions 213A. Next, root portions of the oblique portions 213A are bent such that short sides thereof are radially-inner surfaces to form the third and fourth rectilinear portions 203 and 204. An approximately hexagonal coil body in which the conductor wire 19 is wound into a helical shape for two turns is produced thereby.

Next, each of the oblique portions 211A, 212A, and 213A is formed into a circular arc shape that has a set curvature (a circular arc forming step), producing a coil 200.

Because reduction of cross-sectional area and formation of the bulging portions 211B, 212B, and 213B are performed simultaneously in the bulging portion forming step in this manner, a dedicated step for reducing the cross-sectional area of the bulging portion 211B, 212B, and 213B is no longer required, enabling the coils 200 to be produced without increasing machine time.

Because bulging portions 211B, 212B, and 213B that have reduced cross-sectional area are formed in the bulging portion forming step by crushing positions of formation of the bulging portions on the conductor wire 19 using the bulging portion forming tools 70 while bending each bulging portion into a convex shape, lengths of the bulging portions 211B, 212B, and 213B can be controlled by adjusting the amount of crushing, enabling the dimensional precision of the coils 200 to be improved.

In this manufacturing method, surfaces of the bulging portions 211B, 212B, and 213B that face axially inward before crank portion formation also face axially inward after crank portion formation, and surfaces of the bulging portions 211B, 212B, and 213B that face axially outward before crank portion formation also face axially outward after crank portion formation.

Moreover, in Embodiment 1 above, the cross-sectional area of the first through fourth rectilinear portions 201, 202, 203, and 204 and the oblique portions 211A, 212A, and 213A is similar or identical, but the cross-sectional area of the oblique portions 211A, 212A, and 213A may be made smaller than the cross-sectional area of the first through fourth rectilinear portions 201, 202, 203, and 204.

In Embodiment 1 above, the oblique portions at the two ends of the bulging portions are formed so as to have identical cross-sectional shapes, but the oblique portions at the two ends of the bulging portions may be formed so as to have different cross-sectional shapes.

In Embodiment 1 above, coils 200 that are produced by winding a conductor wire for two turns are mounted to an armature core 11 so as to be arranged at a pitch of one slot in a circumferential direction, but coil groups in which coils 200 are arranged at a pitch of one slot in a circumferential direction may be mounted to the armature core 11 so as to be arranged in two layers in a radial direction. An armature winding that is configured in this manner constitutes a winding that is equivalent to an armature winding that is configured such that coils that are produced by winding the conductor wire for four turns are arranged at a pitch of one slot in a circumferential direction.

Embodiment 2

Figure 15A:
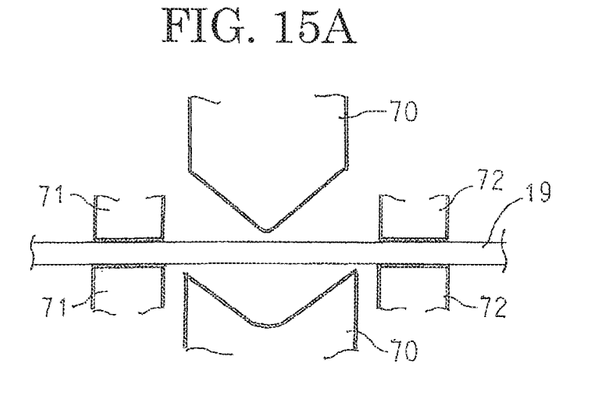
FIG. 15A is a diagram that explains a state before formation of a bulging portion in a bulging portion forming step in a manufacturing method for an armature winding coil that is used in a rotary electric machine according to Embodiment 2 of the present invention.
Figure 15B:
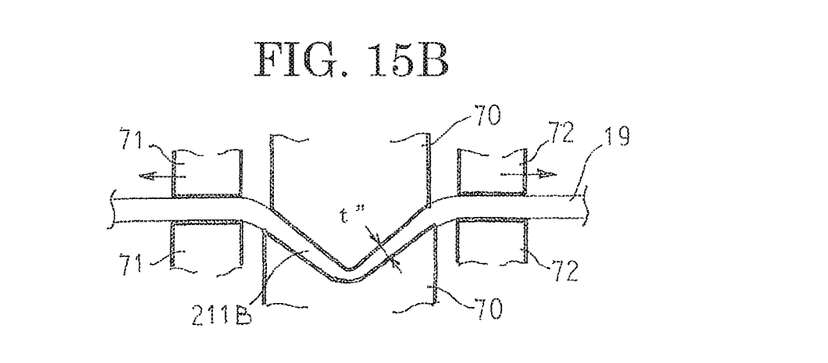
FIG. 15B is a diagram that explains a state after formation of the bulging portion in the bulging portion forming step in the manufacturing method for the armature winding coil that is used in the rotary electric machine according to Embodiment 2 of the present invention.

FIG. 15A is a diagram that explains a state before formation of a bulging portion in a bulging portion forming step in a manufacturing method for an armature winding coil that is used in a rotary electric machine according to Embodiment 2 of the present invention, and FIG. 15B is a diagram that explains a state after formation of the bulging portion in the bulging portion forming step in the manufacturing method for the armature winding coil that is used in the rotary electric machine according to Embodiment 2 of the present invention.

In a bulging portion forming step according to Embodiment 2, as shown in FIG. 15A, two ends of a position of formation of a bulging portion 211B on a conductor wire 19 are respectively gripped by a first drawing tool 71 and a second drawing tool 72. Then, as shown in FIG. 15B, the first drawing tool 71 and the second drawing tool 72 are moved away from each other in the longitudinal direction of the conductor wire 19 while a position of formation of the bulging portion 211B on the conductor wire 19 is pressed and bent by bulging portion forming tools 70 and 70. The region of formation of the bulging portion 211B is thereby reduced in cross-sectional area from S (=t×w) to S" (=t"×w") by being stretched longitudinally, and is bent into a convex shape by the bulging portion forming tools 70 and 70 to form a bulging portion 211B that has reduced cross-sectional area. Bulging portions 212B and 213B that have reduced cross-sectional area are also formed on the conductor wire 19 in a similar manner.

The rest of the steps are similar or identical to those of Embodiment 1.

Consequently, in Embodiment 2, because reduction of cross-sectional area and formation of the bulging portions 211B, 212B, and 213B are performed simultaneously in the bulging portion forming step, a dedicated step for reducing the cross-sectional area of the bulging portion 211B, 212B, and 213B is no longer required, also enabling the coils 200 to be produced without increasing machine time.

Because the cross-sectional area of bulging portions 211B, 212B, and 213B is reduced by drawing the conductor wire 19, lengths of the bulging portions 211B, 212B, and 213B can be controlled by adjusting the amount of drawing, enabling the dimensional precision of the coils 200 to be improved.

Embodiment 3

Figure 16A:
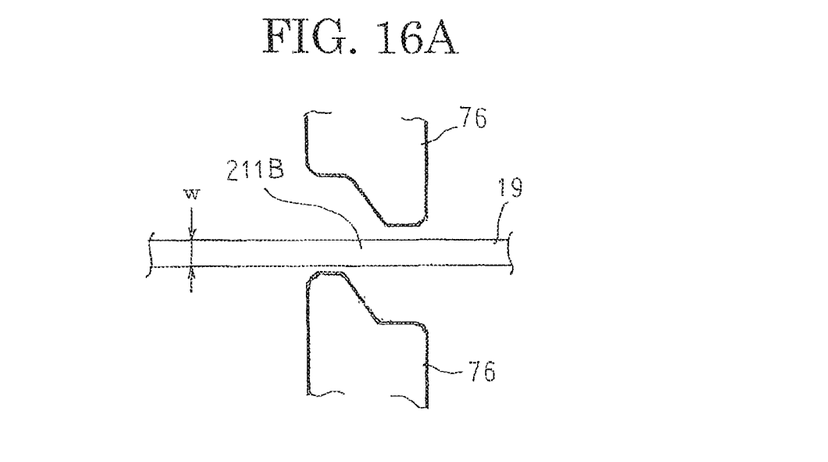
FIG. 16A is a diagram that explains a state before formation of a crank portion in a crank portion forming step in a manufacturing method for an armature winding coil that is used in a rotary electric machine according to Embodiment 3 of the present invention.
Figure 16B:
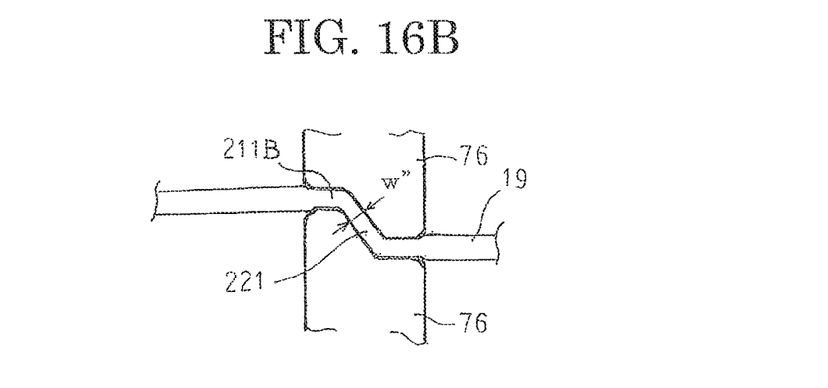
FIG. 16B is a diagram that explains a state after formation of the crank portion in the crank portion forming step in the manufacturing method for the armature winding coil that is used in the rotary electric machine according to Embodiment 3 of the present invention.

FIG. 16A is a diagram that explains a state before formation of a crank portion in a crank portion forming step in a manufacturing method for an armature winding coil that is used in a rotary electric machine according to Embodiment 3 of the present invention, and FIG. 16B is a diagram that explains a state after formation of the crank portion in the crank portion forming step in the manufacturing method for the armature winding coil that is used in the rotary electric machine according to Embodiment 3 of the present invention.

In a bulging portion forming step according to Embodiment 3, bulging portions 211B, 212B, and 213B are formed by bending so as to have a convex shape using bulging portion forming tools 70 and 70 without reducing the cross-sectional area of the conductor wire 19. Then, as shown in FIG. 16A, the bulging portion 211B is positioned between a pair of crank portion forming tools 76. Next, as shown in FIG. 16B, the bulging portion 211B is crushed by the pair of crank portion forming tools 76 from short-side length directions. The bulging portion 211B is thereby bent into a crank shape at the same time as the cross-sectional area is reduced from S (=t×w) to S" (=t"×w"), forming a crank portion 221. The bulging portions 212B and 213B are similarly bent into crank shapes at the same time as the cross-sectional area is reduced, forming crank portions 221.

The rest of the steps are similar or identical to those of Embodiment 1.

Consequently, in Embodiment 3, because formation of the crank portions 221 and reduction of cross-sectional area of the bulging portions 211B, 212B, and 213B are performed simultaneously in the crank portion forming step, a dedicated step for reducing the cross-sectional area of the bulging portion 211B, 212B, and 213B is no longer required, also enabling the coils 200 to be produced without increasing machine time.

Because crank portions 221 and bulging portions 211B, 212B, and 213B that have reduced cross-sectional area are formed in the crank portion forming step by crushing the bulging portions 211B, 212B, and 213B using the crank portion forming tools 76 while bending them into a crank shape, lengths of the bulging portions 211B, 212B, and 213B can be controlled by adjusting the amount of crushing, enabling the dimensional precision of the coils 200 to be improved.

Here, in the crank portion forming step, portions of the conductor wire 19 at two ends of the bulging portion 211B may each be gripped by a drawing tool, and the drawing tools moved away from each other in the longitudinal direction of the conductor wire 19 while the bulging portion 211B of the conductor wire 19 is bent into the crank shape by the crank portion forming tool 76, to form a crank portion 221.

In each of the above embodiments, cases in which the present application is applied to an electric motor have been explained, but similar or identical effects are also exhibited if the present application is applied to a generator.

In each of the above embodiments, the slots are formed at a ratio of two slots per phase per pole, but slots may be formed at a ratio of one slot per phase per pole, or three or more slots per phase per pole.

In each of the above embodiments, cases in which spacing between rectilinear portions that are linked by coil end portions is a pitch of six slots (a pitch of one magnetic pole) have been explained, but the spacing between the rectilinear portions that are linked by the coil end portions is not limited to a pitch of six slots provided that the coils are distributed winding coils, and may be a pitch of five slots, for example.

In each of the above embodiments, coils that are produced by winding a conductor wire for two turns are used, but the number of turns in the coils is not limited to two turns, provided that it is 2n turns, where n is an integer that is greater than or equal to one.

In each of the above embodiments, cases in which an armature winding is configured using hexagonal coils have been explained, but the coils are not limited to hexagonal coils, provided that the coils can be configured into a distributed-winding armature winding in which coil end portions that link rectilinear portions include oblique portions and a bulging portion, in which a crank portion that displaces a radial position of the rectilinear portions is formed on the bulging portion, and in which a cross-sectional area of the bulging portion is smaller than a cross-sectional area of the oblique portions, and may be U-shaped coils, or wave-wound coils, for example.

The invention claimed is:

1. A rotary electric machine comprising an armature that includes:
    an annular armature core in which a plurality of teeth are arranged circumferentially, and in which slots are formed between said teeth; and
    an armature winding that is mounted to said armature core,
wherein:
    said armature winding is constituted by a plurality of distributed-winding coils that are each produced by winding a conductor wire that is insulated, that is jointless and continuous, and that has a rectangular cross section;
    said coils each include:
    2m rectilinear portions that are inserted into a pair of slots that comprise two of said slots so as to have longitudinal directions oriented in an axial direction, where m is an integer that is greater than or equal to one; and
    (2m−1) coil end portions that link said 2m rectilinear portions consecutively by each connecting together end portions of two selected rectilinear portions among said 2m rectilinear portions,
    said coils being mounted in one or more layers in a radial direction in said armature core so as to be arranged at a pitch of one slot in a circumferential direction;
    said coil end portions include:
    a bulging portion that protrudes axially outward in a convex shape; and
    oblique portions that link said two connected rectilinear portions and said bulging portion;
    said bulging portion has a crank portion that displaces radial positions of said two connected rectilinear portions by a set amount; and
    a cross-sectional shape of said bulging portion is a rectangular shape and a cross-sectional area of said bulging portion is smaller than a cross-sectional area of said oblique portions.

2. The rotary electric machine according to claim 1, wherein a radial width of said bulging portion is narrower than a radial width of said oblique portions.

3. The rotary electric machine according to claim 1, wherein an axial width of said bulging portion is narrower than an axial width of said oblique portions.

4. A manufacturing method for a coil for a rotary electric machine according to claim 1, said manufacturing method comprising:
    a bulging portion forming step that forms said bulging portion by bending and shaping a bulging portion forming portion of said conductor wire into a convex shape;

a crank portion forming step that forms said crank portion by bending and shaping said bulging portion into a crank shape;

an oblique portion forming step that forms said oblique portions by bending said conductor wire at root portions of said bulging portion; and a rectilinear portion forming step that forms said rectilinear portions by bending said conductor wire at root portions of said oblique portions, wherein a cross-sectional area of said bulging portion forming portion of said conductor wire is reduced while bending and shaping said bulging portion forming portion into said convex shape in said bulging portion forming step.

5. The manufacturing method for a coil for a rotary electric machine according to claim 4 wherein said bulging portion forming portion of said conductor wire is clamped by a bulging portion forming tool, and said bulging portion forming portion is crushed while being bent and shaped into said convex shape in said bulging portion forming step.

6. The manufacturing method for a coil for a rotary electric machine according to claim 4 wherein two ends of said bulging portion forming portion of said conductor wire are gripped by drawing tools, and said drawing tools are separated in a longitudinal direction of said conductor wire to stretch said bulging portion forming portion while said bulging portion forming portion is being bent and shaped into said convex shape by said bulging portion forming tool in said bulging portion forming step.

7. A manufacturing method for a coil for a rotary electric machine according to claim 1, said manufacturing method comprising:

a bulging portion forming step that forms said bulging portion by bending and shaping a bulging portion forming portion of said conductor wire into a convex shape;

a crank portion forming step that forms said crank portion by bending and shaping said bulging portion into a crank shape;

an oblique portion forming step that forms said oblique portions by bending said conductor wire at root portions of said bulging portion; and a rectilinear portion forming step that forms said rectilinear portions by bending said conductor wire at root portions of said oblique portions, wherein a cross-sectional area of said bulging portion is reduced while bending and shaping said bulging portion into said crank shape in said crank portion forming step.

8. The manufacturing method for a coil for a rotary electric machine according to claim 7 wherein said bulging portion is clamped by a crank portion forming tool, and said bulging portion is crushed while being bent and shaped into said crank shape in said crank portion forming step.

9. The manufacturing method for a coil for a rotary electric machine according to claim 7 wherein two ends of said bulging portion of said conductor wire are gripped by drawing tools, and said drawing tools are separated in a longitudinal direction of said conductor wire to stretch said bulging portion while said bulging portion is being bent and shaped into said crank shape by said crank portion forming tool in said crank portion forming step.

* * * * *